(12) United States Patent
Moriya et al.

(10) Patent No.: US 7,564,145 B2
(45) Date of Patent: Jul. 21, 2009

(54) VEHICLE CONTROL APPARATUS

(75) Inventors: Yoshihito Moriya, Nagoya (JP); Haruyuki Urushihata, Chiryu (JP); Akihiko Takenaka, Anjo (JP)

(73) Assignees: Toyota Jidosha Kabushiki Kaisha, Toyota-Shi (JP); Denso Corporation, Kariya-Shi (JP)

( * ) Notice: Subject to any disclaimer, the term of this patent is extended or adjusted under 35 U.S.C. 154(b) by 291 days.

(21) Appl. No.: 11/519,804

(22) Filed: Sep. 13, 2006

(65) Prior Publication Data
US 2007/0075584 A1    Apr. 5, 2007

(30) Foreign Application Priority Data
Oct. 4, 2005    (JP)    ............... 2005-290980

(51) Int. Cl.
*B60L 1/00*    (2006.01)
(52) U.S. Cl. ........................................ 307/9.1
(58) Field of Classification Search ............... 307/10.1, 307/39, 9.1
See application file for complete search history.

(56) References Cited
U.S. PATENT DOCUMENTS
4,639,609 A * 1/1987 Floyd et al. ............. 307/10.1
7,043,650 B2 * 5/2006 Bresniker et al. ........... 713/324
7,173,347 B2 * 2/2007 Tani et al. .................. 307/10.1
2005/0029867 A1 * 2/2005 Wood ........................ 307/10.1
2005/0103298 A1    5/2005 Schafer et al.

FOREIGN PATENT DOCUMENTS
JP    A 2003-189696    7/2003

* cited by examiner

*Primary Examiner*—Robert L. Deberadinis
(74) *Attorney, Agent, or Firm*—Oliff & Berridge PLC

(57) ABSTRACT

A vehicle includes a battery and an alternator as a power source, and a plurality of vehicle load groups that operate commonly receiving power supply from the power source. When a plurality of requests for actuating the plurality of loads are made simultaneously, a control circuit determines a request of higher priority and a request of lower priority based on a predetermined priority for each of said requests. The control circuit operates the corresponding load as requested in response to the request of high priority, and operates the corresponding load with the operation limited to consume smaller power than requested in response to the request of low priority. More preferably, one of the plurality of loads is variable valve timing apparatus changing a timing of opening/closing an intake valve or an exhaust valve of an internal combustion engine.

12 Claims, 4 Drawing Sheets

VEHICLE CONTROL APPARATUS

This nonprovisional application is based on Japanese Patent Application No. 2005-290980 filed with the Japan Patent Office on Oct. 4, 2005, the entire contents of which are hereby incorporated by reference.

BACKGROUND OF THE INVENTION

1. Field of the Invention

The present invention relates to a vehicle control apparatus and, more specifically, to a vehicle control apparatus including a plurality of loads that operate commonly receiving power supply from a power source.

2. Description of the Background Art

Recently, various electronically controlled equipment and facilities have come to be mounted on a vehicle. When a plurality of devices having different power consumption capacities are to be actuated simultaneously, however, a voltage drop occurs, resulting in lower speed of overall actuation. As a solution, it has been necessary to install a large generator or to increase battery capacity.

Japanese Patent Laying-Open No. 2003-189696 discloses a technique in which priorities are set among a plurality of devices, and when drive of a device having high priority becomes necessary, supply of driving power to a device of lower priority is stopped, whereby the generator size is reduced.

When the supply of driving power to the device is stopped, however, the device is set to an inoperative state. Long duration of the inoperative state possibly leads to a problem. Further, the device of which operation is once stopped takes longer time to attain the target operation.

SUMMARY OF THE INVENTION

An object of the present invention is to provide a vehicle control apparatus allowing appropriate operation of a plurality of loads while maintaining operations of the plurality of loads as much as possible.

In summary, the present invention provides a vehicle control apparatus, wherein the vehicle includes a power source apparatus and a plurality of loads that operate commonly receiving power supply from the power source apparatus; when a plurality of requests for actuating the plurality of loads are made simultaneously, the control apparatus determines a request of higher priority and a request of lower priority based on a predetermined priority for each of the requests, and the control apparatus operates the corresponding load as requested in response to the request of high priority, and operates the corresponding load with the operation limited to consume smaller power than requested in response to the request of low priority.

Preferably, the control apparatus limits an operation corresponding to the request of low priority when an output voltage of the power source apparatus is smaller than a prescribed threshold value, and does not limit an operation corresponding to the request of low priority when the output voltage of the power source apparatus is not lower than the prescribed threshold value.

Preferably, the vehicle further includes an internal combustion engine; and requests for the plurality of loads are classified in advance into a plurality of groups; and the priority differs group by group among the plurality of groups, and the priority is the same in each group.

More preferably, one of the plurality of loads is a variable valve timing apparatus changing a timing of opening/closing an intake valve or an exhaust valve of the internal combustion engine; one of the plurality of groups is a group to which a first request for actuating the variable valve timing apparatus belongs; and another one of the plurality of groups has the priority higher than the first request.

More preferably, one of the plurality of loads is a variable valve timing apparatus changing a timing of opening/closing an intake valve or an exhaust valve of the internal combustion engine; one of the plurality of groups is a group to which a first request for actuating the variable valve timing apparatus belongs; and another one of the plurality of groups has the priority lower than the first request.

More preferably, one of the plurality of loads is a variable valve timing apparatus changing a timing of opening/closing an intake valve or an exhaust valve of the internal combustion engine; one of the plurality of groups is a group to which a first request for actuating the variable valve timing apparatus at the time of starting belongs; and another one of the plurality of groups is a group to which a second request for actuating the variable valve timing apparatus after starting, having the priority lower than the first request, belongs.

According to another aspect, the present invention provides a vehicle control apparatus, wherein the vehicle includes a power source apparatus and a plurality of loads that operate commonly receiving power supply from the power source apparatus; when a plurality of requests for actuating the plurality of loads are made simultaneously, the control apparatus determines a load of higher priority and a load of lower priority based on a predetermined priority for each of the plurality of loads, and the control apparatus causes the power source apparatus to supply unlimited power to the load of high priority, and causes the power source apparatus to supply limited power to the load of lower priority.

Preferably, the control apparatus causes the power source apparatus to limit power supply to the load of lower priority when an output voltage of the power source apparatus is smaller than a prescribed threshold value, and does not cause the power source apparatus to limit power supply to the load of lower priority when an output voltage of the power source apparatus is larger than the prescribed threshold value.

Preferably, the vehicle further includes an internal combustion engine; the plurality of loads are classified in advance into a plurality of groups; and the priority differs group by group among the plurality of groups, and the priority is the same in each group.

More preferably, one of the plurality of loads is a variable valve timing apparatus changing a timing of opening/closing an intake valve or an exhaust valve of the internal combustion engine; one of the plurality of groups is a group to which the variable valve timing apparatus belongs; and another one of the plurality of groups has the priority higher than the variable valve timing apparatus.

More preferably, one of the plurality of loads is a variable valve timing apparatus changing a timing of opening/closing an intake valve or an exhaust valve of the internal combustion engine; one of the plurality of groups is a group to which the variable valve timing apparatus belongs; and another one of the plurality of groups has the priority lower than the variable valve timing apparatus.

According to a still further aspect, the present invention provides a method of controlling a vehicle including a power source apparatus and a plurality of loads that operate commonly receiving power supply from the power source apparatus, including: the step of detecting, when a plurality of requests for actuating the plurality of loads are made simultaneously, based on a predetermined priority for each of the requests, presence/absence of a first request of high priority;

and the step of operating, in response to the first request, a corresponding load as requested, and operating, in response to a second request of lower priority than the first request, a corresponding load with the operation limited to consume smaller power than requested.

By the present invention, necessary power is supplied to a device of high priority, and therefore, control is possible without hindering the actuation thereof Further, power supply to a device of lower priority is not fully stopped but reduced and the operation is maintained, and therefore, even a device or devices of lower priority can attain to the target more quickly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
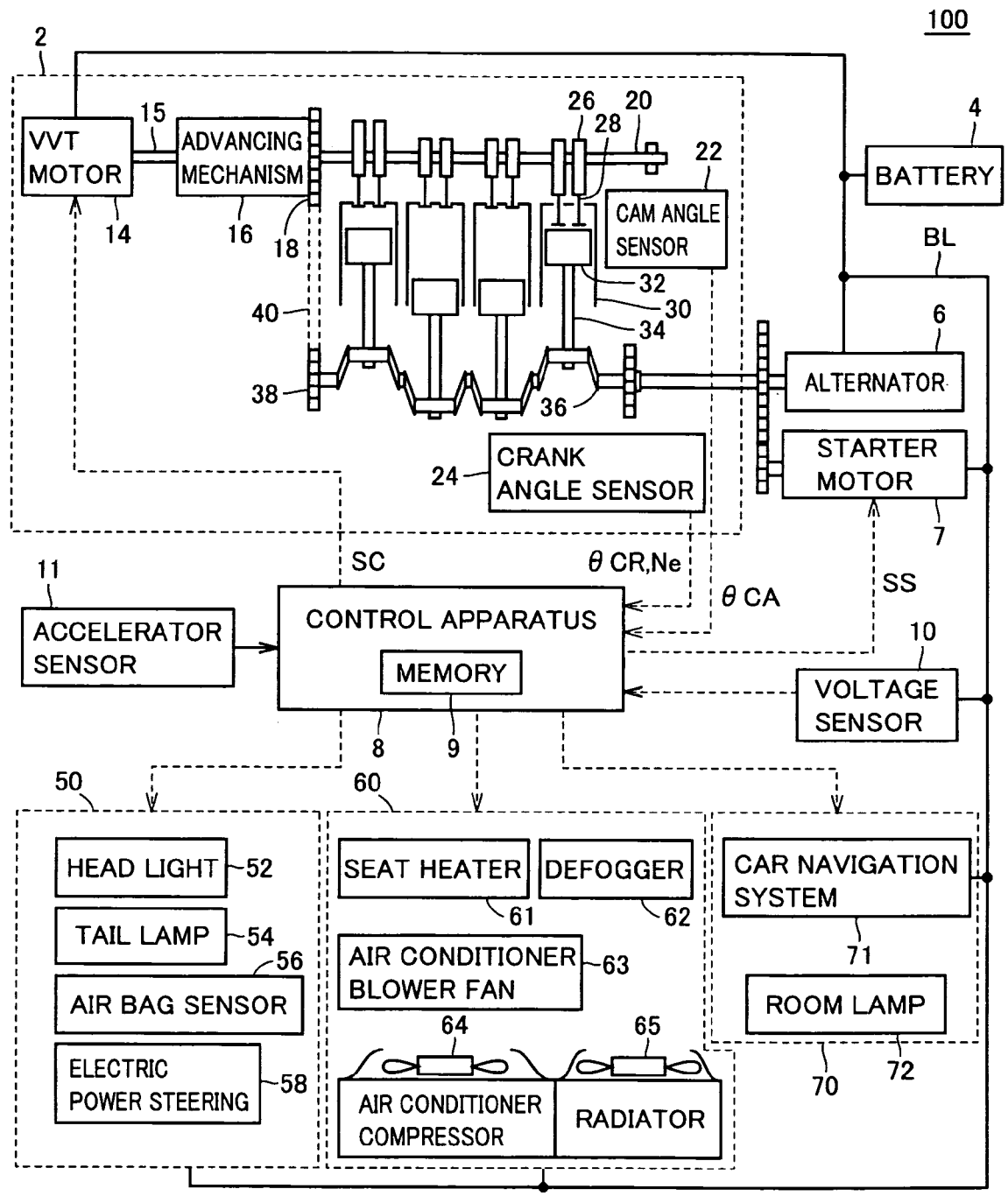
FIG. 1 shows a configuration of a vehicle 100 in accordance with an embodiment of the present invention.

In the following, the present invention will be described in detail with reference to the figures. Throughout the figures, the same or corresponding portions are denoted by the same reference characters and description thereof will not be repeated.

FIG. 1 shows a configuration of a vehicle 100 in accordance with an embodiment of the present invention.

Referring to FIG. 1, vehicle 100 includes an internal combustion engine 2, a buttery 4, an alternator 6, a control circuit 8, a voltage sensor 10 and an accelerator sensor 11.

Internal combustion engine 2 includes a cylinder 30 provided in a cylinder block, a piston 32 reciprocated in cylinder 30, and a connecting rod 34 connecting piston 32 and a crank shaft 36.

Internal combustion engine 2 further includes crank shaft 36, an intake cam shaft 20, a cam 26 fixed to intake cam shaft 20, an intake valve 28, which is an air valve opened/closed as it is pressed down by cam 26 along with the rotation of intake cam shaft 20, and a valve timing varying unit varying the timing of rotation of intake valve 28 by changing a rotational phase of intake cam shaft with respect to crank shaft 36.

Intake cam shaft 20 rotates as crank shaft 36 rotates. Cam 26 is fixed on intake cam shaft 20, and determines opening position of intake valve 28 based on the distance of outer circumference from the rotation axis of intake cam shaft 20.

Internal combustion engine 2 is provided with a variable valve timing (VVT) mechanism. Valve timing varying unit changes the timing of opening and closing intake valve 28 by changing the rotational phase of intake cam shaft with respect to crank shaft 36 based on a timing control signal SC.

The valve timing varying unit includes a VVT (Variable Valve Timing) motor 14 and an advancing mechanism 16. The force of a sprocket wheel 38 mounted on the crank shaft is transmitted to a sprocket wheel 18 through a chain 40, and rotates advancing mechanism 16. VVT motor 14 rotates, receiving power from battery 4. Advancing mechanism 16 rotates intake cam shaft 20 in accordance with the torque applied from a rotation axis 15 of VVT motor 14 and the torque applied from sprocket wheel 18.

Internal combustion engine 2 further includes a cam angle sensor 22 detecting a rotation angle of intake cam shaft 20 by detecting rotation of a projection provided on intake cam shaft 20, and a crank angle sensor 24 detecting a rotation angle of crank shaft 36. Though not shown, internal combustion engine 2 is a double overhead cam shaft (DOHC) engine, and includes an exhaust cam shaft and an exhaust valve, not shown.

Control circuit 8 receives phase information θCA from cam angle sensor 22 and receives engine speed Ne and phase information θCR from crank angle sensor 24, and controls rotation speed such that rotation axis 15 of VTT motor 14 rotates basically in the same phase as sprocket wheel 18, by control signal SC.

Referring to a requested VVT advancing angle determined based on the output of accelerator sensor 11 and engine speed, control circuit 8 slightly increases or decreases the rotation speed of VVT motor 14 until the advancing angle is reflected on the phase difference in the output of cam angle sensor 22 and the output of crank angle sensor 24.

When actuated abruptly, VVT motor 14 consumes large power. Therefore, in vehicle 100, other vehicle loads are prioritized and classified, and the loads are controlled group by group classified based on the priority.

Vehicle 100 further includes a vehicle load group 50 having higher priority than VVT motor 14, a load group 60 of large power consumption and lower priority than VVT motor 14, and a load group 70 of small power consumption and lower priority than VVT motor 14.

By way of example, load group 50 includes a head light 52, a tail lamp 54, an air bag sensor 56, and an electric power steering 58. These are highly important loads related to running of the vehicle.

Load group 60 includes a seat heater 61, a defogger 62 implemented by a hot wire embedded in a rear window, an air-conditioner blower fan 63, a fan 64 for feeding air to an air conditioner condenser, and a fan 65 feeding air to a radiator. These are loads mainly related to passenger comfort consuming relatively large power.

Load group 70 includes a car navigation system 71 and a room lamp 72. These are loads mainly related to passenger comfort consuming relatively small power.

Specifically, vehicle 100 includes battery 4 and alternator 6 as power source apparatuses, and a plurality of load groups 50, 60 and 70 that operate commonly receiving power supply from the power source. When there are a plurality of simultaneous requests for actuating the plurality of loads, control circuit 8 determines actuation requests of higher priority and actuation requests of lower priority based on predetermined priorities for respective requests, so that in response to a request of high priority, the corresponding load is operated as requested, and in response to a request of low priority, the corresponding load is operated with the operation limited to consume smaller power than requested. Priorities corresponding to respective requests are classified and stored in advance in a memory 9 provided in control circuit 8.

Figure 2:
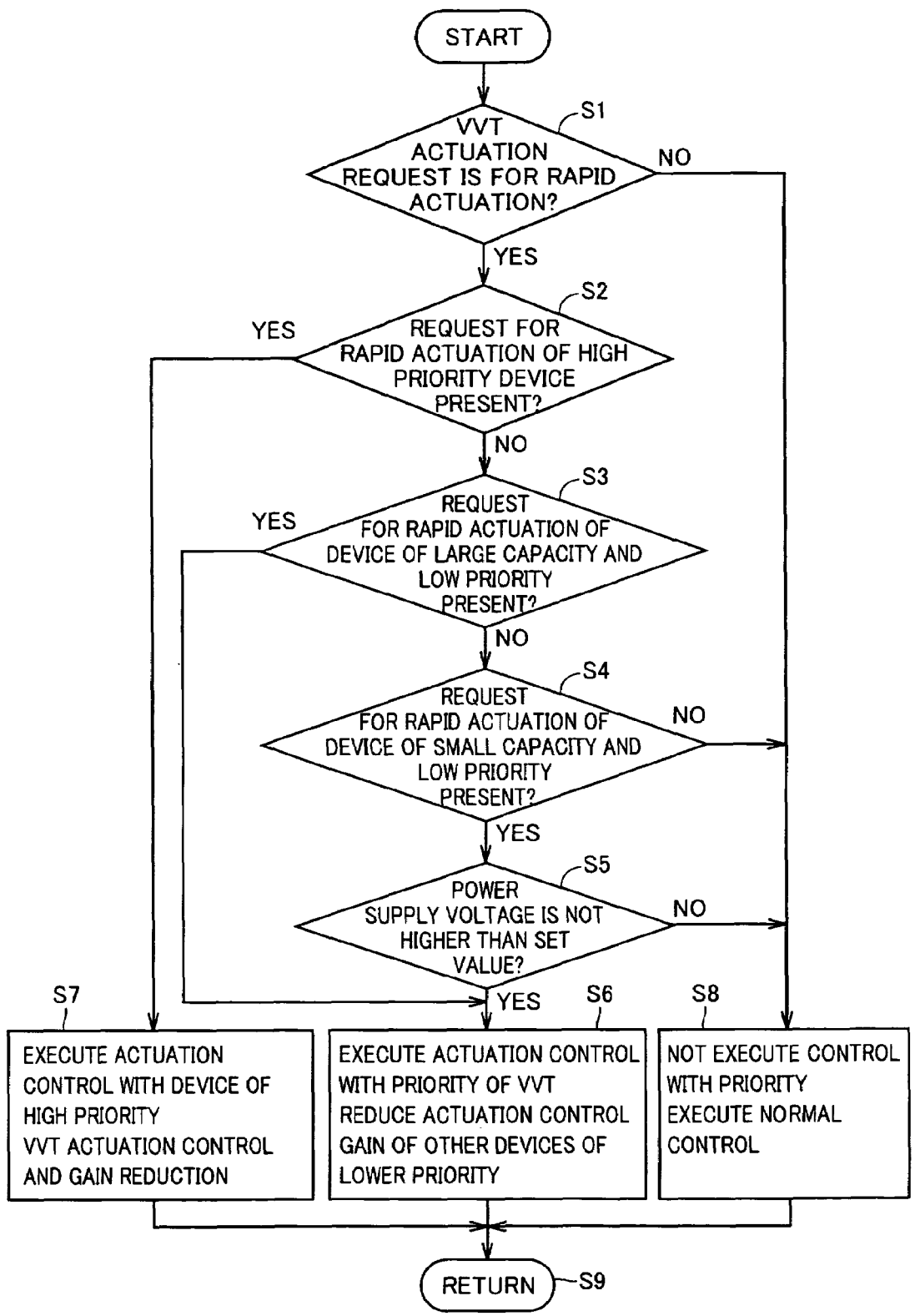
FIG. 2 is a flowchart representing a control structure of a program executed by a control circuit 8 shown in FIG. 1 upon reception of a VVT motor actuation request.

FIG. 2 is a flowchart representing a control structure of a program executed by control circuit 8 shown in FIG. 1 upon reception of a VVT motor actuation request.

The flowchart is called from the main routine and executed when a request is made to actuate VVT, by an operation of accelerator sensor 11 or by load variation.

Referring to FIGS. 1 and 2, when the process starts, control circuit 8 determines whether the request for actuating VVT is for rapid actuation or not, at step S1. By way of example, the output of accelerator sensor 11 is monitored and when the amount of stepping of an accelerator pedal increases abruptly, or when the load or the rotation speed change abruptly because of road gradient variation or the like, then the target advancing angle of VTT changes abruptly.

If the difference between the target value and the present advance angle is large, proportional control corresponding to the difference is performed and, therefore, the request for VVT actuation is determined to be a request for rapid actuation.

When the condition of step S1 is satisfied, the flow proceeds to step S2, and otherwise, the flow proceeds to step S8.

At step S2, whether there is a request for rapid actuation of a device of high priority or not is determined. Here, the device of high priority means the load belonging to load group 50 of FIG. 1, including, for example, head light 52, tail lamp 54, air bag sensor 56 and electric power steering 58.

At step S2, when there is a request for rapid actuation of the device of high priority, for instance, when head light 52 is turned on or power steering 58 is actuated by an abrupt operation of steering wheel, it is determined that there is a request for rapid actuation of the device of high priority. In that case, flow proceeds to step S7, and actuation control of the device of high priority is executed. VVT motor 14 is controlled such that gain for executing proportional control for a requested value determined by acceleration sensor 11 and vehicle load is reduced.

When it is determined at step S2 that there is no request for rapid actuation of a device of high priority, flow proceeds to step S3.

At step S3, whether there is a request for actuating a device of large capacity with low priority or not is determined. Here, the device of large capacity with low priority means a device that causes, because of large power consumption, voltage drop when operated, though it need not be actuated with higher priority than VVT. By way of example, a load with power consumption of 80 W or more corresponds to the device of large capacity with low priority.

When it is determined at step S3 that there is a request for actuating a device of large capacity with low priority, the flow proceeds to step S6. If it is determined that there is no request for actuating a device of large capacity with low priority, the flow proceeds to step S4.

At step S4, whether there is a request for actuating a device of small capacity with low priority or not is determined. Here, the device of small capacity with low priority corresponds to a load belonging to load group 70 of FIG. 1, such as car navigation system 71 or room lamp 72. The request corresponds to pressing of a search button of car navigation system 71 or lighting of room lamp 72.

When it is determined at step S4 that there is a request for actuating a device of small capacity with low priority, the flow proceeds to step S5. If it is determined that there is no such request, the flow proceeds to step S8.

At step S5, the voltage of power line BL is monitored by voltage sensor 10 and taken into control circuit 8, and whether this value is not higher than a set value (for example, 10V) or not is determined. When the power supply voltage is not higher than the set value at step S5, the flow proceeds to step S6, and when the power supply voltage is higher than the set value at step S5, the flow proceeds to step S8.

The flow proceeds to step S8 when the request for actuating VVT is not a request for rapid actuation, that is, when the power consumption is not very large; when the request for actuating VVT is a request for rapid actuation and there is no request for actuating other load circuits; or when the request is for a device of low capacity with low priority and the voltage of power line BL determined by battery 4 and alternator 6 is sufficiently high. In such a case, control with priority is not executed, and normal control is done in which no particular restriction is imposed on any request.

The flow proceeds to step S6 when the request for actuating VVT is a request for rapid actuation and there is a request for actuating a device of large capacity with low priority, or when there is a request for actuating a device of small capacity with low priority and the power supply voltage of power line BL is not higher than the set value.

In such a case, actuation control with priority of VVT is executed, and the gain for actuation control of other devices with low priority is decreased. For instance, the value of a current caused to flow through seat heater 61 may be decreased to half the requested value, or air conditioner fan 64, radiator fan 65 and air conditioner blower fan 63 may be operated with the rotation speed lowered. It is noted that a large current is caused to flow through VVT motor 14 by the rapid actuation of VVT for about 1 second, and therefore, it is not likely that the passenger feels uncomfortable because of, for example, weaker air-conditioning.

As for the car navigation system 71 that corresponds to the device of small capacity with low priority, even when there is a request for searching a route to a destination is input through an operation panel, the route search is not performed for a prescribed time period (about 1 second at the longest) until the rapid actuation of VVT is completed and the system is maintained in a state of low power consumption, and the route search is started after the prescribed time period, in accordance with an instruction from control circuit 8.

When the process of step S6, S7 or S8 is complete, the flow proceeds to step S9, and the control returns to the main routine.

Figure 3:
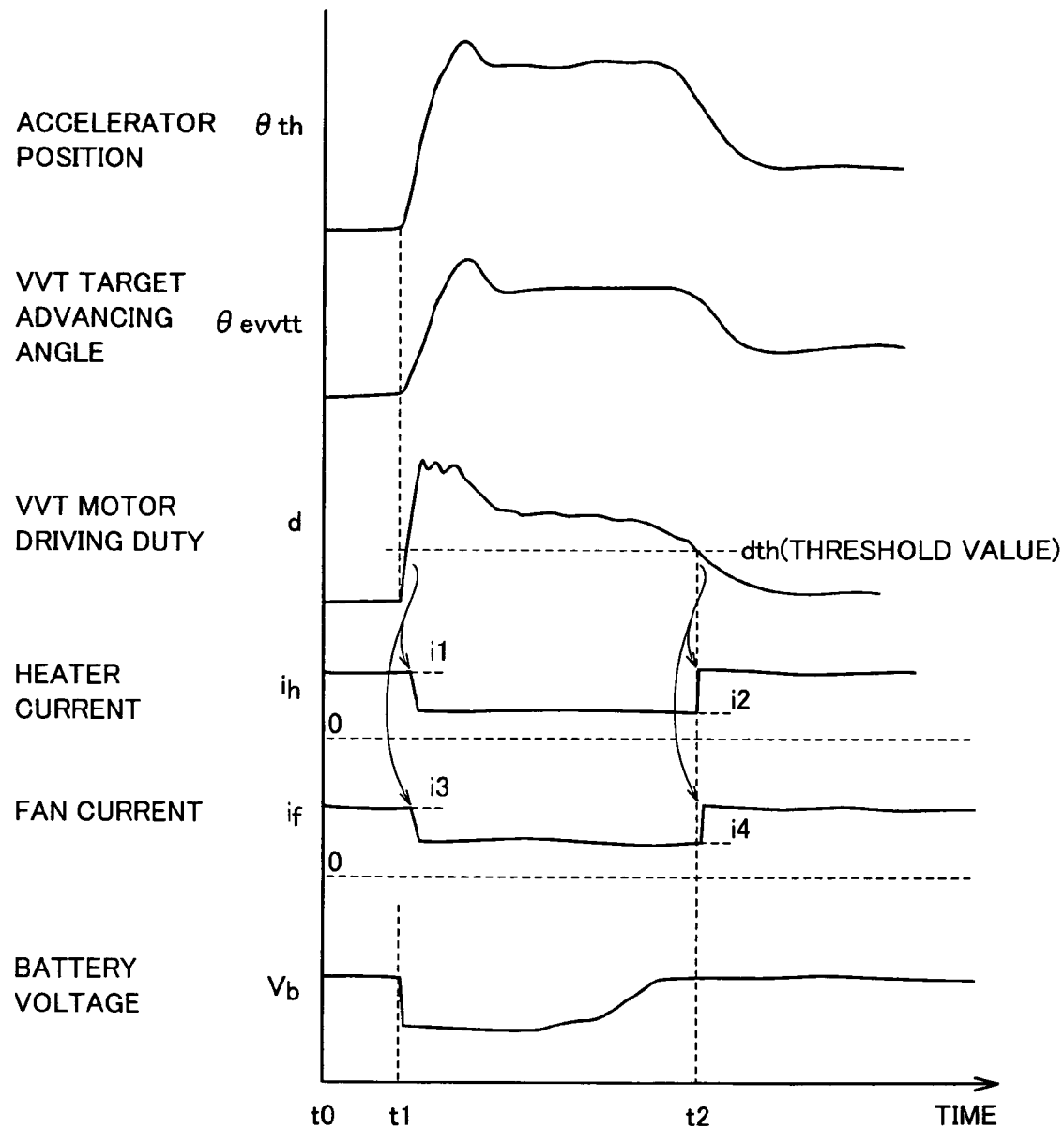
FIG. 3 is a diagram of operational waveforms representing an example of current variation when control is performed in accordance with the flowchart of FIG. 2.

FIG. 3 is a diagram of operational waveforms representing an example of current variation when control is performed in accordance with the flowchart of FIG. 2.

Referring to FIG. 3, first, at time t1, an accelerator pedal is pressed and accelerator position θth starts to increase. In response, the target advancing angle θevvtt of VVT calculated inside the control circuit 8 increases rapidly. To follow the target advancing angle, control circuit 8 causes, by control signal SC, rapid increase of driving duty d of VVT motor 14. As a result, the motor driving duty d exceeds the threshold voltage dth. It is noted that when motor driving duty d increases, the current consumed by VVT motor 14 also increases.

In response to the motor driving duty d exceeding the threshold value dth, control circuit 8 changes a current ih of seat heater 61 and a current if of air conditioner fan 64. Heater current ih is decreased from i1 to i2, and fan current if is decreased from i3 to i4, and from time point t1 to t2, operation of these loads is maintained.

In other words, in the time period from t1 to t2, control gives higher priority to the operation of VVT motor than the heater or the fan.

When the VVT motor driving duty d becomes lower than the threshold value dth at time point t2, heater current ih is returned from the limited value i2 to the requested current value i1, and fan current if is also returned from the limited value i4 to the requested current value i3.

In this manner, according to the present embodiment, when a VVT motor that feeds large power when actuated rapidly is used in a power system such as a vehicle, other vehicle loads, that is, devices that consume power similar to the VVT motor, are classified in advance into loads to be operated with high priority, loads of large capacity with low priority and loads of small capacity with low priority, and when the VVT is actuated rapidly, actuation control with priority is executed, making determination with the state of power supply voltage taken into consideration.

Consequently, it becomes unnecessary to provide excessive margin on the power system, so that size reduction of power system becomes easier, and appropriate control of VVT apparatus is realized.

[Modification 1]

VVT is provided for improving mileage (fuel consumption) by changing timings of opening and closing intake valve and the like in accordance with vehicle load or accelerator position. If the timing of closing the intake valve is delayed too much at the start of operation, engine start may possibly fail because of insufficient compression of the intake air in the combustion chamber.

Therefore, at the time of starting, it is necessary to operate VVT motor 14 with priority to realize appropriate closing timing before engine ignition. Otherwise, the engine would not start. In other words, at the time of starting, VVT control must be done with higher priority than at other times.

Figure 4:
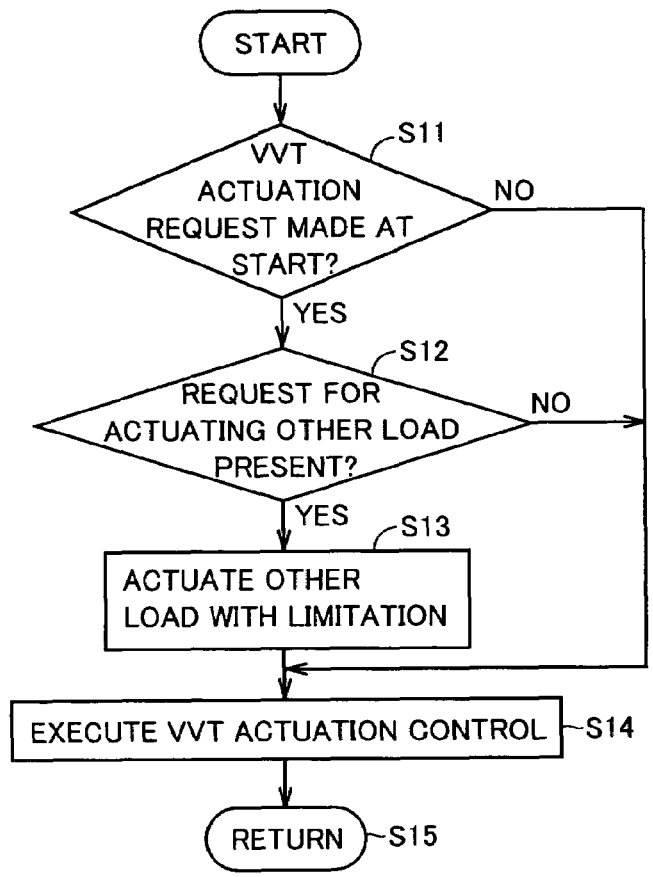
FIG. 4 is a flowchart representing a control structure of control executed in a first modification.

FIG. 4 is a flowchart representing a control structure of control executed in the first modification.

Referring to FIG. 4, first, at step S11, control circuit 8 determines whether the request for actuating VVT is made at the time of starting or not. It may be determined by monitoring an output of crank angle sensor 24 and checking whether the engine has already been rotating or not. Alternatively, it may be determined dependent on whether the request for actuating VVT is made simultaneously with a request for starting the engine.

At step S11, if the request for actuating VVT is made at the time of starting, the flow proceeds to step S12, and otherwise, the flow proceeds to step S14.

At step S12, control circuit 8 determines whether there is any other request for actuating other load or loads that can be limited.

By way of example, whether there is a request for actuating the room lamp or air conditioner fan or not is determined, and whether such devices are in operation or not upon request is determined. When it is determined at step S12 that there is a request for actuating other load or loads, the flow proceeds to step S13, and control circuit 8 actuates other load or loads with limitation. After the end of processing of step S13, the flow proceeds to step S14.

When it is determined at step S12 that there is not a request for actuating any other load, the flow proceeds to step S14.

At step S14, VVT actuation control is executed. Then, the flow proceeds to step S15 and the control is returned to the main routine. Because of such processing, not all the requests for actuating VVT are set to have high priority than other loads of low priority but the requests are set to have priorities determined dependent on the contents of control. Consequently, more appropriate control becomes possible.

[Modification 2]

Figure 5:
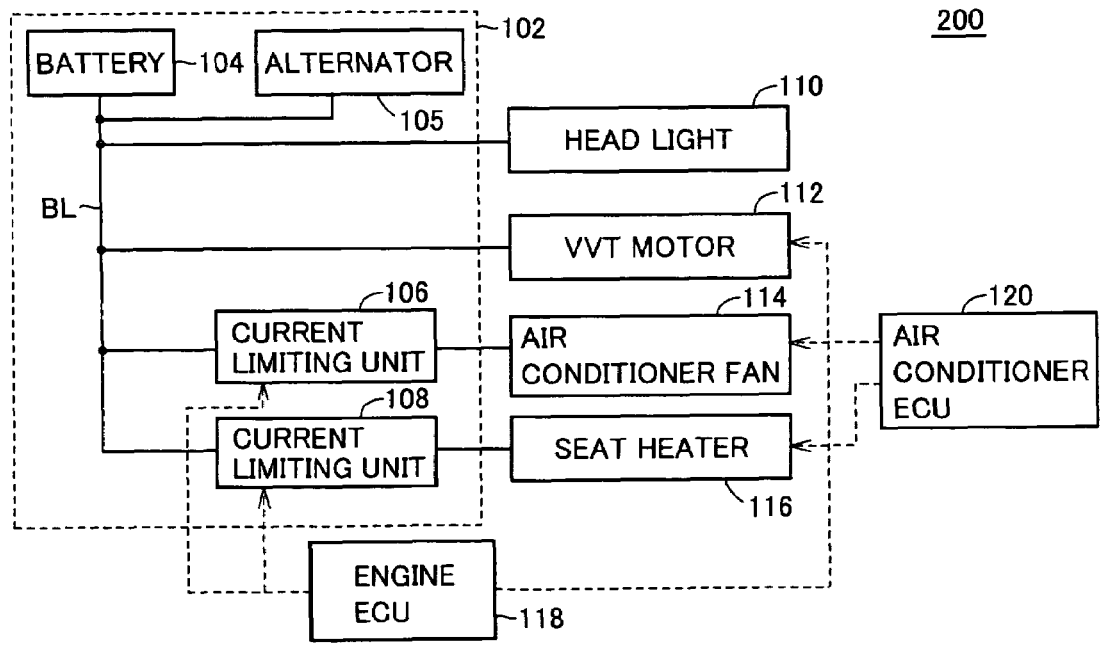
FIG. 5 shows a configuration of a vehicle 200 in accordance with a second modification.

FIG. 5 shows a configuration of a vehicle 200 in accordance with a second modification.

Referring to FIG. 5, a vehicle 200 includes a power source apparatus 102; a head light 111, a VVT motor 112, an air conditioner fan 114 and a seat heater 116 as vehicle loads; an engine ECU 118; and an air conditioner ECU 120.

Power source apparatus 102 includes a battery 104, an alternator 105, and current limiting units 106 and 108. By the state of charge of battery 104, state of generation of alternator 105 and the state of current consumed by each load, the voltage on power line BL is determined.

Here, for air conditioner fan 114 and seat heater 116 that are devices of lower priority than VVT motor 112, current limiting units 106 and 108 are provided between power line BL and the respective devices.

Engine ECU 118 controls VVT motor 112 and controls valve advancing angle, and controls current limitation by current limiting units 106 and 108.

By such a structure, when a request for actuating air conditioner fan 114 and seat heater 116 is made independently by air conditioner ECU 120, actuation with priority of VVT can be realized by adding or changing current limiting units 106 and/or 108 and by the contents of control of engine ECU 118, while maintaining the state of ECU 120 as it is. In other words, actuation with priority of VVT can be realized without making any particular change to ECU 120.

As described above, in the present embodiment, necessary power is supplied to the device of higher priority, and therefore, control without hindering the operation of the device becomes possible.

Further, it is not the case that the power is not supplied at all to the devices of lower priority, but devices of lower priority still operate with reduced power. Therefore, targets can be reached more quickly even in these devices.

When the priority is determined as the contents of control and not set device by device, more delicate control can be realized in an appropriate manner.

Further, when actuation is limited in view of the state of power supply voltage, unnecessary limit on the actuation can be avoided when the voltage state is satisfactory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle control apparatus of a vehicle having an engine, the vehicle comprising:
   a power source apparatus; and
   a plurality of loads that operate commonly receiving power supply from the power source apparatus, one of the plurality of loads being a variable valve timing apparatus changing a timing of opening/closing an intake valve or an exhaust valve of the internal combustion engine, wherein
   when a plurality of requests for actuating the plurality of loads are made simultaneously, the vehicle control apparatus determines a request of higher priority and a request of lower priority based on a predetermined priority for each of the requests, and the control apparatus operates the corresponding load as requested in response to the request of high priority, and operates the corresponding load with the operation limited to consume smaller power than requested in response to the request of low priority.

2. The vehicle control apparatus of claim 1, wherein
   when an output voltage of the power source apparatus is smaller than a prescribed threshold value, the vehicle control apparatus limits an operation corresponding to the request of low priority, and when the output voltage of the power source apparatus is not lower than the prescribed threshold value, the control apparatus does not limit an operation corresponding to the request of low priority.

3. The vehicle control apparatus of claim 1, the vehicle further comprising an internal combustion engine, wherein requests for the plurality of loads are classified in advance into a plurality of groups; and priority differs group by group among the plurality of groups, and the priority is the same in each group.

4. The vehicle control apparatus of claim 3, wherein one of the plurality of groups is a group to which a first request for actuating the variable valve timing apparatus belongs; and another one of the plurality of groups has priority higher than the first request.

5. The vehicle control apparatus of claim 3, wherein one of the plurality of groups is a group to which a first request for actuating the variable valve timing apparatus belongs; and another one of the plurality of groups has priority lower than the first request.

6. The vehicle control apparatus of claim 3, wherein one of the plurality of groups is a group to which a first request for actuating the variable valve timing apparatus at a time of starting belongs; and another one of the plurality of groups is a group to which a second request for actuating the variable valve timing apparatus after starting, having priority lower than the first request, belongs.

7. A vehicle control apparatus of a vehicle having an engine, the vehicle comprising:

a power source apparatus; and a plurality of loads that operate commonly receiving power supply from the power source apparatus; one of the plurality of loads being a variable valve timing apparatus changing a timing of opening/closing one of an intake valve and an exhaust valve of the engine, wherein when a plurality of requests for actuating the plurality of loads are made simultaneously, the control apparatus determines a load of higher priority and a load of lower priority based on a predetermined priority for each of the plurality of loads, and the control apparatus causes the power source apparatus to supply unlimited power to the load of high priority, and causes the power source apparatus to supply limited power to the load of lower priority.

8. The vehicle control apparatus of claim 7, wherein when an output voltage of the power source apparatus is smaller than a prescribed threshold value, the control apparatus causes the power source apparatus to limit power supply to the load of lower priority, and when an output voltage of the power source apparatus is larger than the prescribed threshold value, the control apparatus does not cause the power source apparatus to limit power supply to the load of lower priority.

9. The vehicle control apparatus of claim 7, the vehicle further comprising an internal combustion engine, wherein the plurality of loads are classified in advance into a plurality of groups; and priority differs group by group among the plurality of groups, and the priority is the same in each group.

10. The vehicle control apparatus of claim 9, wherein one of the plurality of groups is a group to which the variable valve timing apparatus belongs; and another one of the plurality of groups has priority higher than the variable valve timing apparatus.

11. The vehicle control apparatus of claim 9, wherein one of the plurality of groups is a group to which the variable valve timing apparatus belongs; and another one of the plurality of groups has priority lower than the variable valve timing apparatus.

12. A method of controlling a vehicle including a power source apparatus and a plurality of loads that operate commonly receiving power supply from the power source apparatus, comprising:

detecting, when a plurality of requests for actuating the plurality of loads are made simultaneously, based on a predetermined priority for each of the plurality of requests, presence/absence of a first request of high priority; and operating, in response to the first request, a corresponding load as requested, and operating, in response to a second request of lower priority than the first request, a second corresponding load with operation limited to consume smaller power than requested, one of the plurality of loads being a variable valve timing apparatus changing a timing of opening/closing one of an intake valve and an exhaust valve of the engine.

* * * * *